US 6,552,720 B1

(12) United States Patent
Gartrell et al.

(10) Patent No.: US 6,552,720 B1
(45) Date of Patent: Apr. 22, 2003

(54) DEVICE AND METHOD FOR COMMUNICATIONS AND ENTERTAINMENT HAVING A BARREL USER-INTERFACE

(75) Inventors: Andrew Julian Gartrell, Calabasas, CA (US); Alastair Stuart Curtis, Woodland Hills, CA (US); Tanja Finkbeiner, Woodland Hills, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 289 days.

(21) Appl. No.: 09/590,501

(22) Filed: Jun. 9, 2000

(51) Int. Cl.[7] .................................................. G09G 5/00
(52) U.S. Cl. .................... 345/184; 345/156; 345/157; 345/158; 348/333.01; 348/333.02; 348/333.06; 348/333.11; 348/14.01; 348/14.03
(58) Field of Search ................................ 345/184, 156, 345/157, 158; 348/333.01, 333.02, 333.06, 333.11, 14.01, 14.03

(56) References Cited

U.S. PATENT DOCUMENTS 5,414,444 A * 5/1995 Britz ........................... 345/156
5,561,458 A * 10/1996 Cronin et al. ................. 348/64
6,181,381 B1 * 1/2001 Evans ...................... 348/333.01

* cited by examiner

Primary Examiner—Richard Hjerpe
Assistant Examiner—Jean Lesperance
(74) Attorney, Agent, or Firm—Jubin Dana; Steven A. Shaw (57) ABSTRACT

A compact device and method for communication and entertainment needs that include combining various functions performed by different keypads and units into a single pad or unit. The device includes circuitry with transceiver capabilities, a chassis, a display, two arms secured to the chassis that can rotate from an open position to a closed position, and a user-interface that provides the user with navigational control and image conversion. The method for reducing the number pads on a keypad of the device, which has the circuitry, includes providing a chassis for securely holding the circuitry, securing a user-interface to the chassis, coupling the user-interface to the circuitry, limiting rotation of the user-interface to a first range of rotational motion using a locking mechanism to provide navigational control, and releasing the locking mechanism to allow rotation of the user-interface beyond the first range of rotational motion to provide image conversion.

17 Claims, 6 Drawing Sheets

DEVICE AND METHOD FOR COMMUNICATIONS AND ENTERTAINMENT HAVING A BARREL USER-INTERFACE

BACKGROUND

This invention generally relates to telecommunications devices and, more specifically, to a wireless communication and enhanced entertainment device.

Typical portable communication devices include a keypad with input functions and a display area. One problem faced by manufacturers of these devices is ergonomically arranging the least number of keypads in the smallest space while maximizing the functions and features of a compact communications device. Current methods include a keypad layout with alpha and numeric properties, some type of navigational pad or dial, and various soft keys.

Soft keys are unmarked keys positioned next to the display; soft keys derive their meaning or function from what is displayed in the display. Known methods of determining the function of each soft key at any given instant are derived by the state of the display in conjunction with the circuitry.

Even though the keypad may include some type of navigational pads, the navigational pads have limited application or use. For example, navigational pads are typically direction input devices with virtually no other applicable use and, hence, not suitable for other applications, such as an input control for highly interactive games that require fast and repetitive entry. Thus, there are a limited number of applications or uses that are compatible with the navigational pads on currently known devices. Furthermore, navigational pads typically occupy a larger space on the keypad than other pads, which further complicates the problem of producing a compact communication device.

In addition to navigational keys, the keypad includes number pads. The number pads are typically used to designate or select alpha characters. For example, the numeric "2" pad can be used in alpha mode to represent the letters "A", "B", and "C". Accordingly, if the user wanted to select and enter the letter "C", then the user would press the numeric "2" pad three or four times until the letter "C" appeared in the display of the communication device. Although inefficient, this is currently one known method for entering words; these alpha-numeric pads are not suitable for typing more than two or three words due to the inefficiency inherent in the design nor are they suitable for use in relation to entertainment functions.

A current solution to the inefficiency inherent in using alpha-numeric pads is to include a full keyboard, such as a QWERTY keyboard. While there are portable devices available that have a QWERTY keyboard linked to a display unit, these devices do not allow for replacement of the keyboard portion with another input type device or module. Additionally, these devices are bulky and deviate away from the desired goal of a compact communications device.

Another problem faced by manufactures of portable devices is how to make a device that is adaptable to the changing needs of users. The problem exists, in part, because the user may at one instant desire to use the device for communication and at another instant desire to use that same device for entertainment purposes. Another reason for the problem of making an adaptable communication device is that current devices have a keypad that is permanently attached to the display unit; the keypad is not replaceable or interchangeable. Consequently, the user can not easily adapt the device to the user's varying needs. Thus, as the user's desired use of the device changes, there is little that can be done to adapt the device to the user's needs; unless, the user purchases a new device designed for the different desired application.

Therefore, what is needed is a compact device capable of and a method for adapting to the user's varying needs, which includes communication and entertainment needs, by combining various functions typically performed by different keypads and/or units into a single pad or unit.

SUMMARY

A compact device and method are provided for adapting to the user's varying needs, which includes communication and entertainment needs, by combining various functions performed by different keypads and units into a single pad or unit.

The device includes electronic circuitry with transceiver capabilities, a chassis for securely holding the electronic circuitry, a display secured to the chassis and coupled to the electronic circuitry for visual communication of information, at least two arms secured to the chassis that can rotate from an open position to a closed position, and a user-interface rotatably secured to the chassis and coupled to the electronic circuitry to provide the user with navigational control and image conversion features.

The method for reducing the number pads on a keypad of a device having electronic circuitry with transceiver capabilities includes providing a chassis for securely holding the electronic circuitry; rotatably securing a user-interface to the chassis; coupling the user-interface to the electronic circuitry; limiting the range of rotation of the user-interface to a first range of rotational motion to provide navigational input; and releasing the user-interface to allow rotation beyond the first range of rotational motion to provide image conversion.

An advantage of the present invention is that user can easily adapt the device to the changing needs. For example, in one mode the device can act purely as a wireless voice communications device, while in another mode the device can act as an entertainment unit or video communications device.

Another advantage of the present invention is that the navigational pads have been eliminated and the navigational control have been combined into a unit that also provides image conversion, thereby reducing the number of pads on and, hence, the size of the device.

Yet another advantage of the present invention is that the arms can be moved or flipped to an open position, which doubles the surface area the device. However, unlike most devices, which flip open to reveal more key pads, that are bulky in the closed position as well as the open position, the ergonomic geometry and shape of the arms allow for a compact and sleek device when the arms are in the closed position.

DETAILED DESCRIPTION

Figure 1:
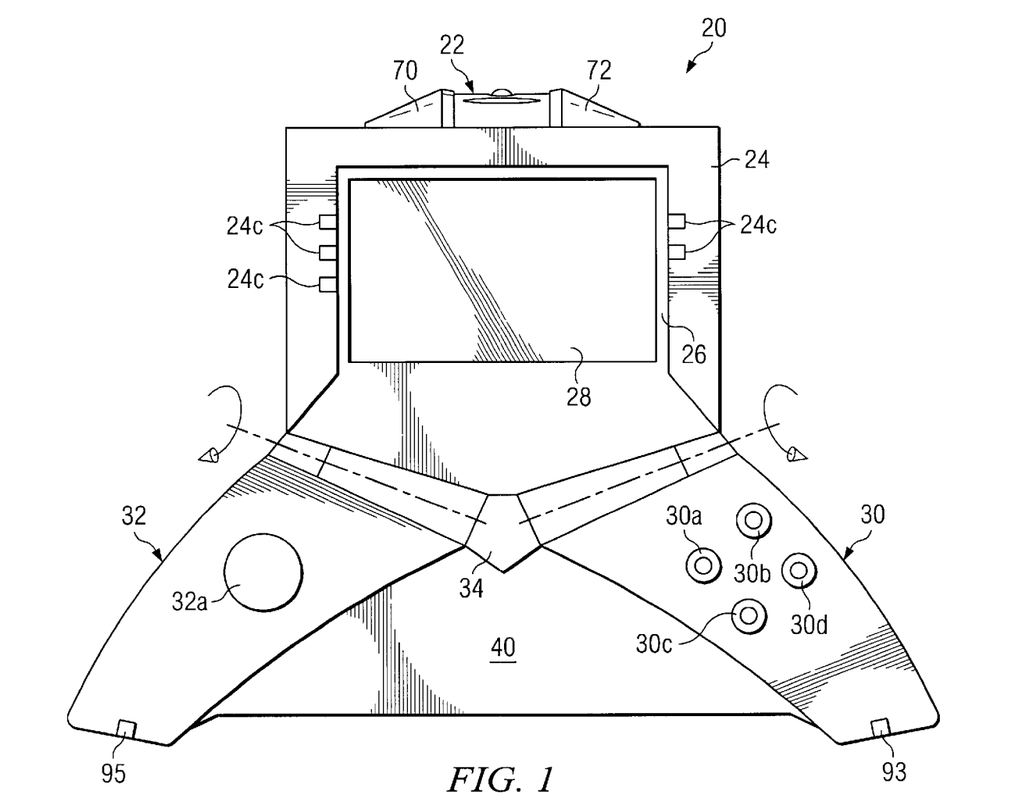
FIG. 1 is a front view of a device with arms in an open position in accordance with the teaching of the present invention.
Figure 2:
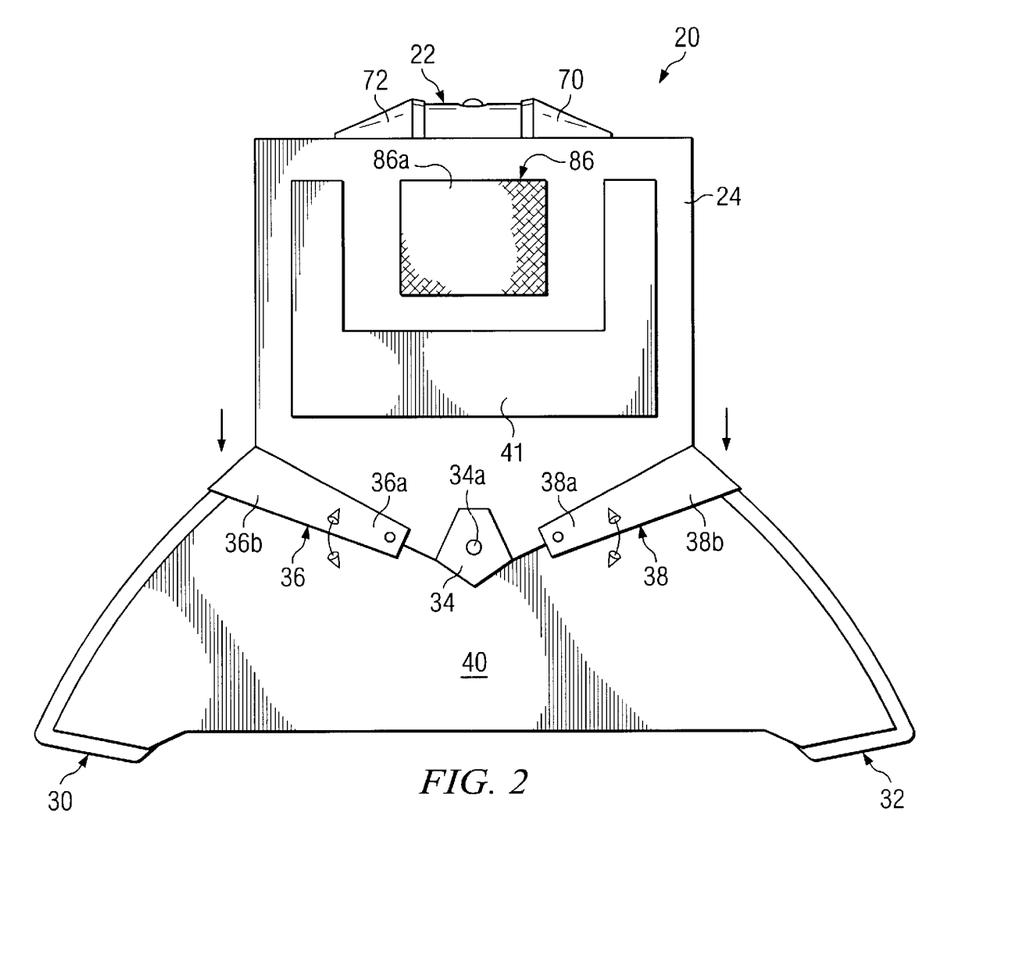
FIG. 2 is a rear view of the device of FIG. 1 with the arms in an open position.
Figure 3:
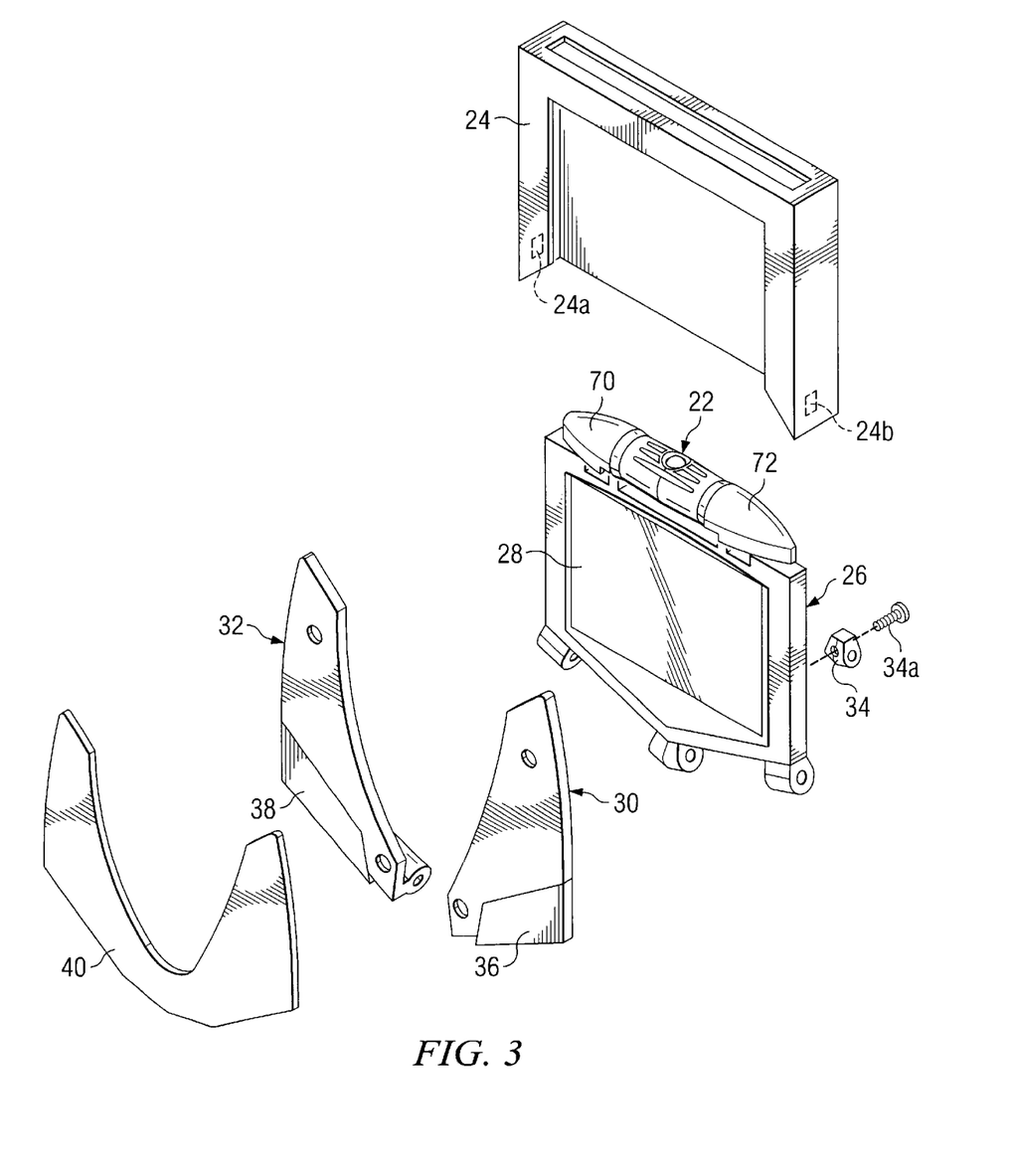
FIG. 3 is an exploded view of the device of FIG. 1 with a first and second arm in the closed position.

Referring now to FIGS. 1, 2, and 3, a device 20 includes a barrel user-interface (BUI) 22 and a shell 24 both of which are secured to a chassis 26. In the preferred embodiment, the shell 24 is made of a poly-based material and a wide range of shells can be made available each with a specific functional application. The chassis 26 is made of a rigid material, such as a light weight alloy, to ensure structural integrity and rigidity during user operation. Additionally, the chassis 26 holds in place a display 28. In the preferred embodiment, the display unit 28 is a liquid crystal display (LCD) that incorporates touch screen capabilities. However, the display can be any type of display and the teachings or the scope of the claims as set forth herein are not limited thereby.

Arms 30 and 32 are rotatably secured to the chassis 26 using a keystone 34 and a securing pin 34a. The securing pin 34a is secured to the chassis 26. The method by which the securing pin 34a secures the keystone 34 to the chassis 26 does not limit the scope of the invention set forth herein. For example, the securing pin 34a can be a screw-in type, a lock-in type, or a snap-in type of securing mechanism. With the keystone 34 secured in place, the arm 30 rotates about an axis that is non-liner and non-parallel to an axis about which the arm 32 rotates.

The arm 30 includes input pads 30a, 30b, 30c, and 30d. The arm 32 includes a pad 32a, such as a four-way button. The arms 30 and 32 are interchangeable with a variety of other arms with various functional or input features, such as a keyboard, that can be used in place of the input devices already discussed and the scope of the claims is not limited by the function, form, or type of input device. Additionally, the arms 30 and 32 have input controls 36 and 38, respectively.

In the preferred embodiment, an internal end portion 36a of the input control 36 is pivotally secured to the arm 32 in such away to allow an external end portion 36b of the input control 36 to move about the pivotally secured internal end portion 36a. Likewise, an internal end portion 38a of the input control 38 is pivotally secured to the arm 32 in such a way to allow an external end portion 38b of the input control 38 to move about the pivotally secured internal end portion 38a of the input control 38.

Figure 4:
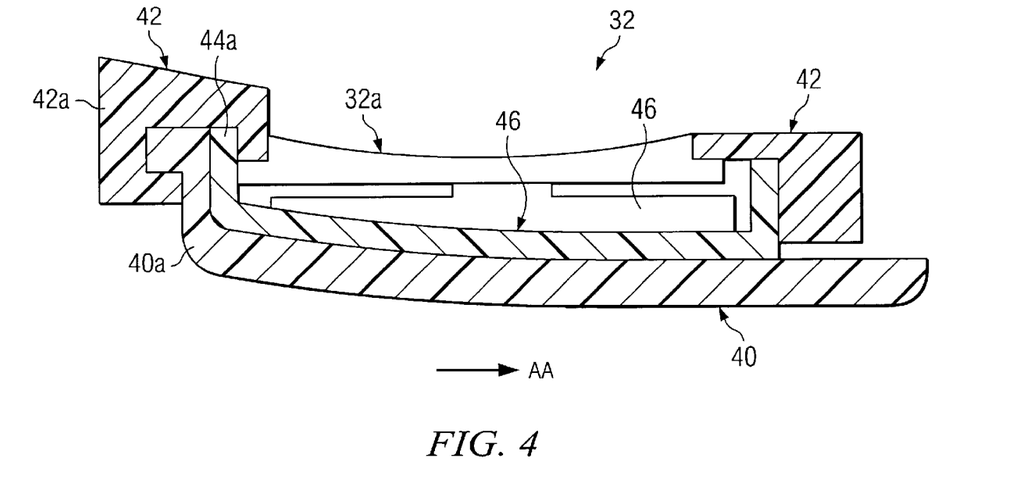
FIG. 4 is a cross sectional view of one of the arms of the device of FIG. 1.

Referring additionally to FIG. 4, an elastomeric piece 40 is removably secured at each end to each of the arms 30 and 32. When the arms 30 and 32 are in the closed position, as shown in the exploded view of FIG. 3, the tension in the plane of the direction AA combined with the angle of the arms 30 and 32 relative to each other and the plane of the chassis 26 retains the arms 30 and 32 in the closed position. On the other hand, when the arms 30 and 32 are in the open position, the angle of the arms 30 and 32 relative to each other, the angle of the arms 30 and 32 relative to the plane of the chassis 26, and the tension in the plane of the direction AA of the elastomeric piece 40 helps retain the arms 30 and 32 in an open position. Thus, the user can easily open and close the arms 30 and 32.

Additional features, such as a locking mechanism, not shown, can be included to lock the arms 30 and 32 in the open and/or a closed position, to prevent accidental closure or opening, respectively, even thought the elastic properties of the elastomeric piece 40 are sufficient to retain the arms 30 and 32 in the open as well as the closed position.

The elastomeric piece 40 is slightly stretched in the closed position, stretched in the open position, and stretched as the arms 30 and 32 move between an open and a closed position. Consequently, the piece 40 loses some of its elastic property over a period of time due to repeated stretching and may need to be replaced. Accordingly, the elastomeric piece 40 is removably secured to the arms 30 and 32 to allow for easy replacement.

Another advantage of making the elastomeric piece 40 easily removable is due in part to the fact that the elastomeric piece 40 can be made in a variety colors. Thus, it is made easily removable to facilitate quick and easy replacement if the user wants to replace an elastomeric piece of one color with an elastomeric piece of a different color.

Referring specifically to FIG. 4, to allow for easy removal, the perimeter of the elastomeric piece 40 is removably secured to an outer edge of each of the arms 30 and 32. For clarity and simplicity only the arm 32 is discussed in detail with respect to how the elastomeric piece 40 is securely held in place. However, the teachings set forth are also applicable to the arm 30. In the preferred embodiment, the elastomeric piece 40 has an L-shaped portion 40a at the perimeter. The L-shape portion 40a of the elastomeric piece 40 is frictionally retained between a lip portion 42a of a chassis 42 of the arm 32 and a lip portion 44a of a cover 44 of the arm 32. Accordingly, as the elastomeric piece 40 is stretched in the direction AA, the lip portion 42a frictionally retains the L-shaped portion 40a while the lip portion 44a prevents motion in the direction AA. Accordingly, the elastomeric piece 40 is securely retained in place.

A variety of shapes can be used in place of the L-shaped portion 40a at the perimeter of the elastomeric piece 40 so long as the elastomeric piece 40 has a portion that can be matingly retained between the chassis 42 and the cover 44 of the arm 32. Accordingly, the scope of the invention is not limited by the shape of the perimeter of the elastomeric piece 40 nor by the cross sectional shape of the retaining portions, such as the lip portion 42a.

In the preferred embodiment, the cover 44 is secured to the chassis 42. The cover 44 is positioned relative to the lip portion 42a of the chassis 42 to ensure a gap exists between the lip portion 42a of the chassis 42 and the lip portion 44a of the cover 44 to allow for slidable removal of the elastomeric piece 40 in a planerly near-perpendicular direction to the direction AA. The separation or volume between the lip portion 44a of the cover 44 and the lip portion 42a of the chassis 42 is approximately the same as the thickness of the portion 40a of the elastomeric piece 40. Thus, as the elastomeric piece 40 is placed under tension in a planerly near-perpendicular direction to the direction AA, the thickness of portion 40a of the elastomeric piece 40 is reduced slightly. This reduction in thickness of the elastomeric piece 40 causes the thickness of the elastomeric piece 40 to be less than the separation between the lip portions 42a of the chassis 42 and the lip portion 44a of the cover 44. Accordingly, the piece 40 can be slidably removed.

Referring specifically to FIG. 2, in a manner similar to the way the elastomeric piece 40 is secured to the arms 30 and 32, an elastomeric U-shaped piece 41 can be secured in position on the back of the shell 24. The U-shaped piece 41 can be color coordinated to complement the elastomeric piece 40. Alternatively, the U-shaped piece 41 can be secured using alternative securing means, such as the use of adhesives or button-like connection.

Continuing with FIG. 4, the pad 32a is shown with circuitry 46 for converting user inputs into electrical signals that are transmitted to the circuitry contained within the chassis 26, which is discussed below. The circuitry 46 is secured to the cover 44 and the cover 44 is secured to the chassis 42.

Figure 5:
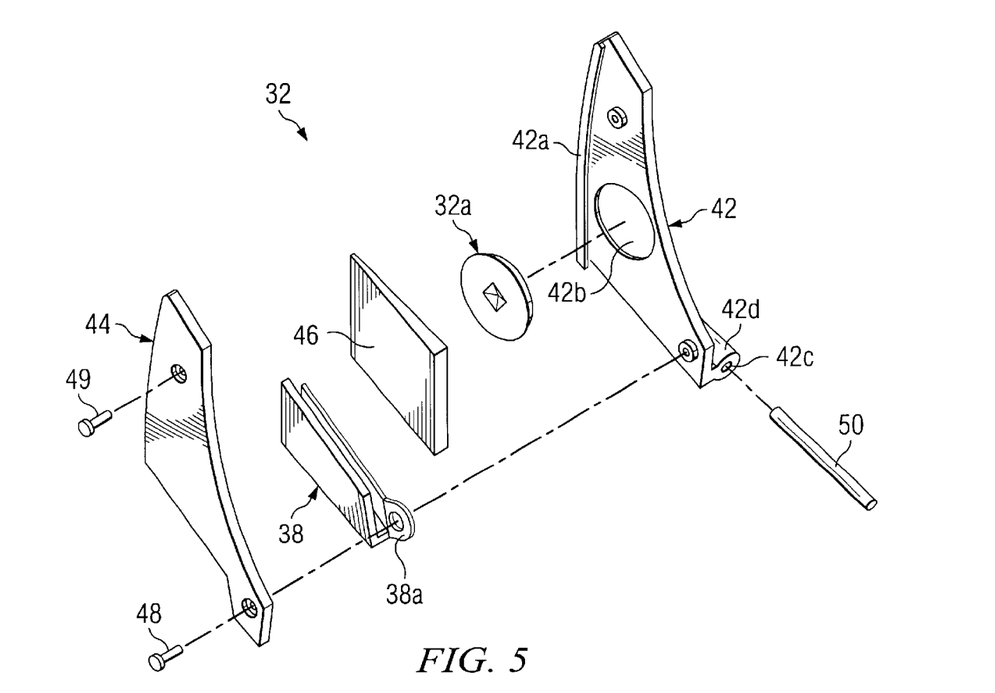
FIG. 5 is an exploded view of one of the arms of the device of FIG.

Referring specifically to FIG. 5, the arm 32 is shown in exploded view without the elastomeric piece 40 and the chassis 26; the arm 32 is shown in the closed position relative to the chassis 26. The internal end portion 38a of the input device 38 is pivotally secured between the cover 44 and the chassis 42 using a connector or rivet 48. A connector or rivet 49 is secured at an opposite end of the cover 44 to the chassis 42. Various types of connectors may be used, such as a screw, without limiting the teachings of the present invention or the scope of the claims set forth herein. The relative positioning of the chassis 42 to the cover 44 is discussed in detail above.

As indicated, the input device 38 is pivotally secured to the chassis 42, such that the input device 38 can be pressed downward to register user input. Additionally, the input device 38 is designed so that it can be pivoted upward to allow for removal of the elastomeric piece 40. The pad 32a is aligned with an opening 42b defined in the chassis 42 and positioned between the cover 44 and the chassis 42 such that when the cover 44 is secured to the chassis 42, the pad 32a is securely held in place. The circuitry 46 is positioned behind the pad 32a and can be secured to the cover 44. The arm 32 is rotatably secured to the chassis 42 and held in place by an axle 50 positioned within an opening 42c of the chassis 42. One end of the axle 50 engagingly mates to an outer female port of the chassis 26. The opposite end of the axle 50 is held in place by a female port positioned in the middle of lower perimeter of the chassis 26 and the keystone 34.

In order to transmit electrical signals and power between the circuitry 46 of the arm 32 and the circuitry contained within the chassis 26, various coupling mechanisms can be utilized. For example, the end portion 42d of the chassis 42 can be electrically coupled to the chassis 26. More specifically, the circuitry 46 can be electrically coupled to the chassis 42. The chassis 42 can be electrically coupled to the chassis 26 through one end portion of the chassis 42. The chassis 26 can be electrically coupled to the circuitry contained within the chassis 26. Thus, through such coupling, the circuitry 46 may be coupled to the circuitry contained within the chassis 26. Hence, the user's inputs can be transmitted to the circuitry contained within the chassis 26.

If necessary, a separate coupling can be established to supply electrical power to the arm 32 through coupling an opposite end of the arm 32 to a power supply. More specifically, an opposite end of the chassis 42 can be coupled to the chassis 26, which is in turn can be coupled to the power supply.

Figure 6:
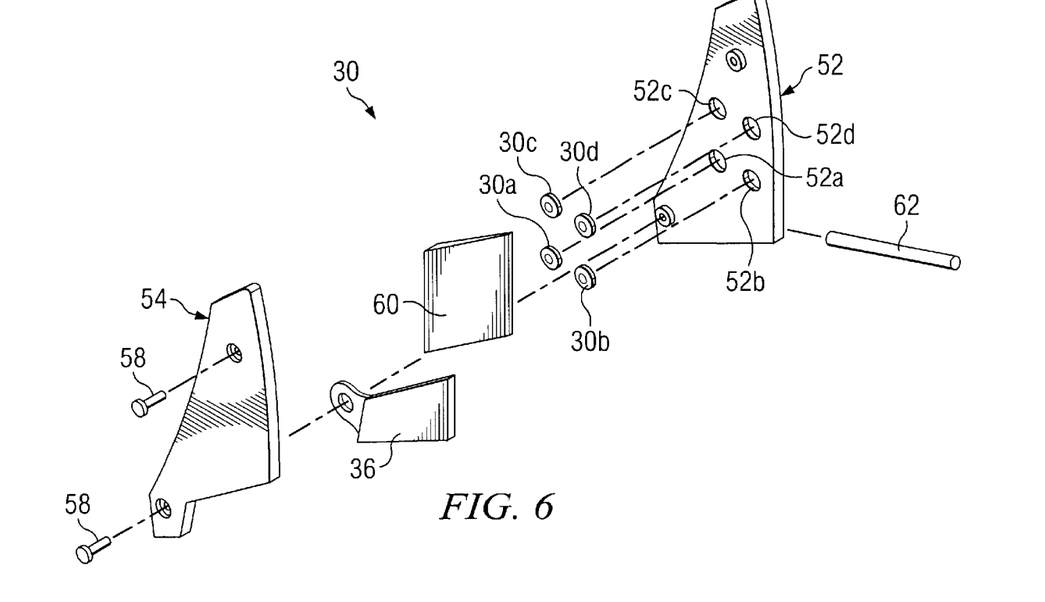
FIG. 6 is an exploded view of another one of the arms of FIG. 1.

Referring now to FIG. 6, the arm 30 includes a chassis 52 and a cover 54 and is shown without the elastomeric piece 40. The input device 36 is positioned between the cover 54 and the chassis 52, such that when the cover 54 is secured to the chassis 52 using a connector or rivet 56 the input device 36 is pivotally secured in place, as discussed above with respect to the arm 32. The cover 54 is further secured at an opposite end to the chassis 52 using a second connector or rivet 58. As indicated above with respect to the arm 32, the arm 30 also has circuitry 60 positioned next to the pads 30a, 30b, 30c, and 30d and is secured to the cover 54 and correspondingly positioned in relation to the pads 30a, 30b, 30c, and 30d.

The pads 30a, 30b, 30c, and 30d are correspondingly positioned behind openings 52a, 52b, 52c, and 52d, respectively, of the chassis 52 of the arm 30. Regardless of how the components of the circuitry 60 are coupled to each other, the circuitry 60 is coupled to the circuitry contained within the chassis 26 similar to the way that the circuitry 46 of the arm 32 is coupled to the circuitry contained within the chassis 26. Although not discussed in detail, the circuitry 60 of the arm 30 can be coupled to the power supply similar to the way the arm 32 is coupled to the power supply.

The arm 30 rotates about an axle 62, which holds the arm 30 in place. Although not discussed in detail, the arm 30 is rotatably secured in place similar to the way that the axle 50 in conjunction with the female port of the chassis 26 and the keystone 34 holds the arm 32 in place.

Referring now to FIGS. 1, 3, 7, and 8, as indicated above, the chassis 26 supports and includes electronic components, such as the display 28, the BUI 22, as well as circuitry for performing the various features set forth herein, including transceiver functions for the device 20. The BUI 22 serves as a navigational tool and a means for converting images into electrical data, such as a camera, which can be used for taking pictures or for video conferencing. The shape of the a barrel 74 of the BUI 22 does not limit the scope of the invention, as set forth in the claim. For example, the BUI 22 may be oval shaped, diamond shaped, or concave shaped. The BUI 22 is secured to the chassis 26 using retaining end pieces 70 and 72. More specifically, the chassis 26 has support mounts 26a and 26b that support the BUI 22. The barrel 74 has end portions 74a and 74b. The end portions 74a and 74b are tapered to matingly correspond to and freely rotate relative to the pieces 70 and 72, respectively, and support mounts 26a and 26b, respectively.

Figure 7:
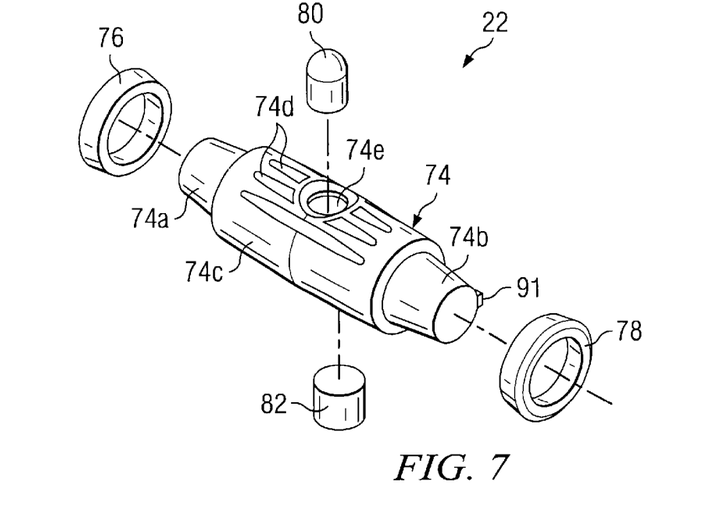
FIG. 7 is an exploded view of a barrel user-interface (BUI) of the device shown in FIG. 1.

There are several ways that the mechanical or rotational motion of the barrel 74 can be converted to electrical signals that are detected by the circuitry contained within the chassis 26. For example, a portions of the end portion 74a or 74b can be made of a conductive material surrounded by insulating material, such that the conductive material matingly corresponds to conductive material on the chassis 26 and/or the piece 70 or the piece 72. For example, if the end portion 74a of the barrel 74 and the support mount 26a of the chassis 26 have matingly corresponding conductive portions, then when the conductive portion of the end portion 74a is aligned with conductive portion of the support mount 26a, a closed circuit is created and, hence, the BUI 22 is electrically coupled to the circuitry contained within the chassis 26.

Alternatively, the end portion 74a or 74b can be cam-shaped to allow for mechanical triggering of a switch that is coupled to the circuitry contained within the chassis 26. Yet another alternative is optical coupling. Thus, it will be apparent to those skilled in the art the there are several options for converting the limited range of mechanical motion of the barrel 74 into electrical signals and the scope of the invention as set forth in the claims is not limited thereby.

Furthermore, the body portion 74c of the barrel 74 includes a plurality of texture grooves 74c that aid the user in gripping the BUI 22 during operation.

The barrel 74 defines a bore 74e with a central axis perpendicular to the axis of the barrel 74. Although shown to be perpendicular, the axis of the bore 74e may be at any angle to the axis of the barrel 74.

The barrel 74 includes rings 76 and 78 that substantially prevent linear motion. The rings 76 and 78 are made of the same material as the elastomeric piece 40, FIG. 1, and, hence, can be color coordinated to complement the elastomeric piece 40 and replaced as desired. Additionally, due to the properties of elastomeric materials, the rings 76 and 78 can also electrically insulate the conductive portions of the barrel from coming into contact with other conductive materials. Furthermore, the rings 76 and 78 can absorb shock due to impacts and, hence, protect the BUI 22.

Referring specifically to FIG. 7, a release button 80 is coaxially positioned within the bore 74e so that one end of the release button 80 extends above the surface of the body portion 74c of the barrel 74. The release button 80 is secured within the bore 74e in such a way to allow axial movement or depression of the release button 80. The release button 80 is spring loaded such that when the release button 80 is pressed and released, the release button 80 returns to the extended position. Pressing the release button 80 releases a locking mechanism 91. The locking mechanism 91 prevents rotation of the barrel 74 beyond a certain point while the barrel 74 is operating as a navigational tool. Thus, pressing the release button 80 allows a greater range of motion for the barrel 74. More specifically, when the BUI 22 is operating in navigational mode, the movement of the barrel 74 is limited to less than 20 degrees of rotational motion because the locking mechanism 91, which is controlled by the release button 80, prevents rotation beyond the limited range. Although the range of motion is limited, any selected range of motion can be used while the barrel 74 is in navigational mode and the scope of the invention is not limited thereby.

Rather, the range of motion of the BUI 22 during navigational mode depends on the location, orientation, and size of a camera unit 82 and the position of the means for converting mechanical motion to electrical signals. More specifically, in the preferred embodiment, the camera unit 82 is coaxially secured within the bore 74e in such a way to prevent exposure of the camera unit 82 while the BUI 22 is moved to-and-fro during navigational mode. Although in the preferred embodiment the camera unit 82 is coaxially mounted within the bore 74e, the camera unit 82 can be mounted at any angle, wherein the axis of the camera unit 82 is at an angle to the axis of the bore 74e. The camera unit 82 is typically recessed slightly below the surface of the body portion 74c of the barrel 74 to protect the camera unit 82.

Once the release button 80 is pressed and the locking mechanism 91 released, then the barrel 74 can be rotated beyond the limited range of motion to expose the camera unit 82. It will be apparent to those skilled in the art that various coupling means can be utilized to couple the camera unit 82 to the circuitry contained within the chassis 26 and the scope of the invention set forth in the claims is not limited thereby. For example, the end portion 74b can be designed with conductive portions and insulated portions corresponding to conductive portions on the support 26a of the chassis 26. Once the barrel 74 is rotated beyond the limited range of motion for navigational mode, then the camera unit 82 is electrically coupled to the circuitry contained within chassis 26, thereby activating the image conversion mode. Alternatively, the camera unit 82 can be coupled to the circuitry contained within the chassis 26 using wires or optical connectors that extend from the camera unit 82 to the circuitry contained within the chassis 26.

Figure 8:
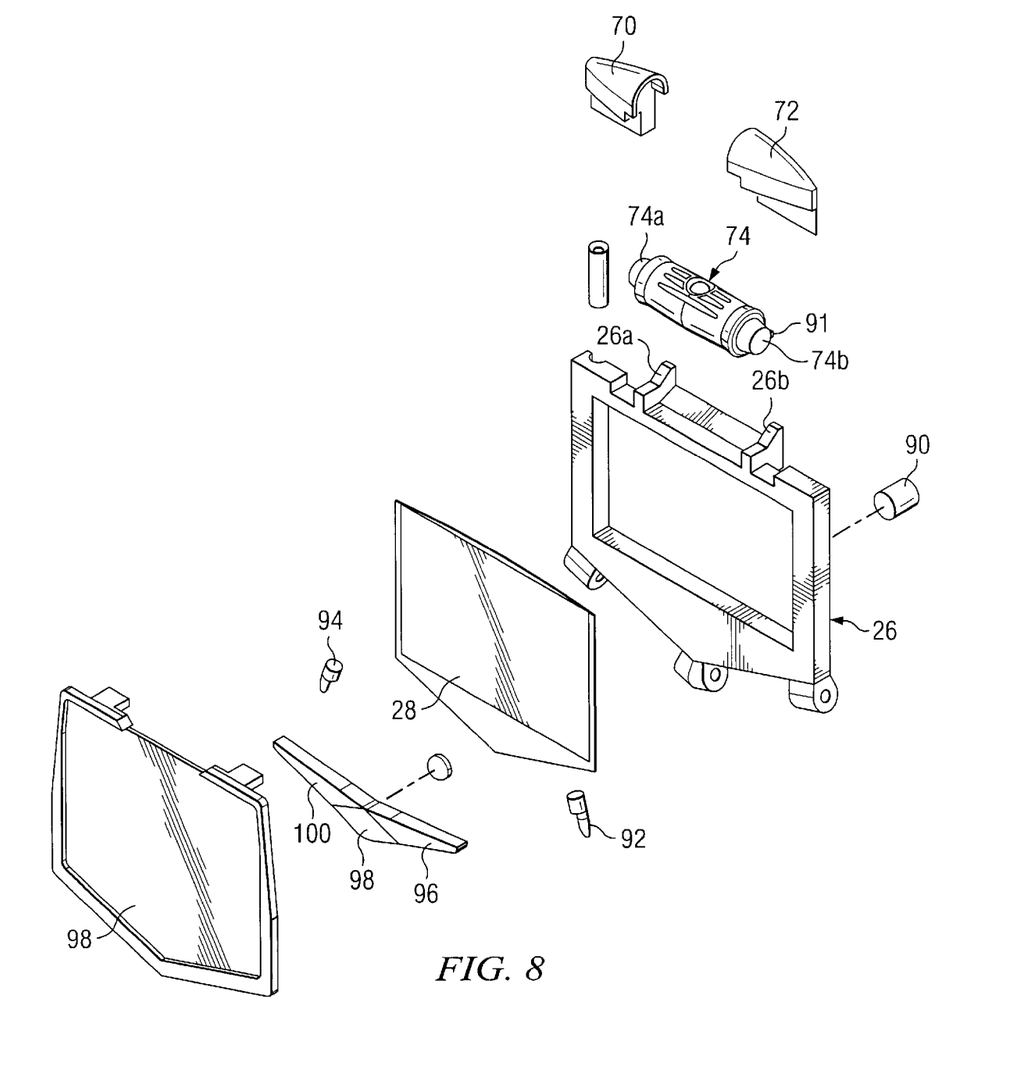
FIG. 8 is a further exploded view of the exploded view of FIG. 3, without the arms, a shell, and an elastomeric piece.

Referring to FIGS. 2 and 8, a sound generating source or speaker 86 is located on the back portion of the shell 24, to resonate sound in an outwardly direction. The speaker 86 has a grill or protective cover 86a that is made of a poly-based material and, unlike traditional speaker protective covers that simply protect the speaker surface from contact with sharp objects, the protective cover 86a forms part of the speaker system. More specifically, the protective cover 86a is a non-porous membrane that resonates to transmit sound waves while preventing dust, moisture, and sharp objects from contacting the surface of the speaker 86.

Microphones 92 and 94 are include at opposite sides of the device 20. Microphones 92 and 94 are coupled to the circuitry contained within the chassis 26 and secured to the chassis 26. This allows for sampling of the sound in the immediate environment of the device 20 to generated surround-sound production for a more realistic video conferencing and real-time entertainment, such as gaming, with other users.

Referring to FIG. 1, speaker-microphone units 93 and 95 can be positioned at the ends of each of the arms 30 and 32, respectively. The units 93 and 95 are coupled to the circuitry contained within the chassis 26. Thus, the user can use the device 20 as a wireless communication device with the arms 30 and 32 in the open position by placing one of the arms in close proximity to the ear to hear and the other arm in close proximity to the mouth to speak, thereby providing the user with the flexibility to answer incoming calls without having to close the arms 30 and 32 or terminate entertainment or gaming functions.

Referring again to FIG. 8, soft keys 96, 98, and 100 are coupled to the circuitry contained within the chassis 26. The soft key 98 can be set such that when the soft key 98 is pressed it has the same effect as simultaneously pressing the soft keys 96 and 100. Alternatively, the soft key 98 can be set up as a hot-link that activates a special feature of the device 20.

Although described in the context of particular embodiments, it will be realized by those skilled in the art that a number of modifications to these teachings may occur. Thus, while the invention has been particularly shown and described with respect to one or more specific embodiments thereof, it will be understood by those skilled in the art that certain modifications or changes, in form and shape, may be made therein without departing from the scope and spirit of the invention as set forth above and claimed hereafter.

What is claimed is:

1. A device having circuitry, which includes transceiver and multimedia functions, that allows a user to transmit and receive information, the device comprising:
   a chassis for securely holding the circuitry;
   a display secured to the chassis and coupled to the circuitry for visual communication of information; and
   a user-interface in the form of a navigation key with an embedded camera, the user-interface rotatably secured to the chassis and coupled to the circuitry operable for providing navigational control and image conversion, wherein movement of the user-interface provides navigation among the information shown on the display and position control of the camera.

2. The device of claim 1, further comprising a lock mechanically coupled to the user-interface, wherein the lock restricts the range of motion of the user-interface when the lock is engaged and allows a greater range of motion when the lock is released.

3. The device of claim 2, wherein the user-interface defines a bore therein and the user-interface comprises:
   a release button pressably secured in one end of the bore and mechanically coupled to the lock for releasing the lock; and wherein the camera is secured at the opposite end of bore and deployed by operation of the release button, the camera is further electrically couple to the circuitry for converting at least one image into electronic data.

4. The device of claim 3, wherein the user-interface is barrel shaped with a plurality of grooves located on the surface of the user-interface adjacent the release button for improving gripping of the user-interface during navigational operation.

5. The device of claim 1, further comprising:
at least two arms having input pads to provide user input for the device, the at least two arms movably secured to the chassis, wherein the arms can rotate from an open position to a closed position, such that the user can grip the arms to hold the device and provide input into device when the arms are in the open position; and
an elastic piece removably secured at opposite ends to each of the arms for securing the arms in the open and the closed position.

6. The device of claim 1, further comprising a shell removably secured to the chassis and coupled to the circuitry, wherein the shell includes soft keys that correspond to functions relating to the shell and the functions are activated when then shell is secured to the chassis and coupled to the circuitry.

7. A method of reducing the number pads on a keypad of a device having circuitry, which includes transceiver and multimedia functions, the method comprising:
providing a chassis for securely holding the circuitry;
rotatably securing in a the chassis user-interface in the form of a navigation key with embedded camera;
coupling the user-interface to the circuitry; and
limiting rotation of the user-interface to a first range of rotational motion to provide navigational input.

8. The method of claim 7 further comprising releasing the user-interface to allow rotation beyond the first range of rotational motion to provide image conversion.

9. The method of claim 8, wherein the step of releasing comprises pressing a release button coupled to a lock to allow rotation beyond the first range of rotational motion.

10. A device having a chassis for securely holding electronic circuitry, which includes transceiver capabilities and multimedia functions, that allows a user to transmit and receive information, the device comprising a user-interface in the form of a navigation key with embedded camera, the user-interface rotatably secured to the chassis, and coupled to the electronic circuitry for providing the user with navigational control in a navigation mode and image conversion in an image conversion mode, wherein movement of the user-interface provides navigation control in navigation mode and camera movement in image conversion mode.

11. The device of claim 10, wherein the modes are defined by a range of motion of the user-interface, characterized in that the user-interface acts as a navigational tool when rotated within a first range of motion and acts as a camera within a second range of motion.

12. The device of claim 11, further comprising a lock secured to the chassis and coupled to the user-interface, wherein the lock restricts the range of motion of the user-interface to the first range of motion when the lock is engaged.

13. The device of claim 12, wherein disengaging the lock allows motion within the second range of motion.

14. The device of claim 12, further comprising:
a release button pressably secured in one end of the bore and mechanically coupled to the lock for releasing the lock; and
a camera secured at an opposite end of the bore and electrically coupled to the electronic circuitry for converting at least one image into electronic form.

15. The device of claim 1, wherein lateral movement of the user-interface provides lateral navigation among the information shown on the display and rotatation of the user-interface provides scrolling type of navigation among the information shown on the display.

16. The device of claim 1, wherein the user-interface is rotatably secured to a first and second end portions, which are in turn moveably secured to the chassis, wherein pressing the first end portion or second end portion provides lateral navigation among the information shown on the display.

17. The device of claim 1 wherein the user-interface is rotatably secured to a first and second end portions, which are in turn moveably secured to the chassis, wherein pressing the at least one end portion selects a portion of the information shown on the display.

* * * * *